(12) United States Patent
Quinn

(10) Patent No.: US 7,216,375 B2
(45) Date of Patent: May 15, 2007

(54) TOILET OVERFLOW CONTROL

(76) Inventor: Michael Quinn, 4001 S. West Shore Blvd. #1414, Tampa, FL (US) 33611

( * ) Notice: Subject to any disclaimer, the term of this patent is extended or adjusted under 35 U.S.C. 154(b) by 0 days.

(21) Appl. No.: 11/330,636

(22) Filed: Jan. 12, 2006

(65) Prior Publication Data

US 2006/0200899 A1    Sep. 14, 2006

(51) Int. Cl.
*E03D 11/02* (2006.01)
*E03D 11/18* (2006.01)
(52) U.S. Cl. ........................................................ 4/427
(58) Field of Classification Search ............ 4/390–394, 4/427
See application file for complete search history.

(56) References Cited

U.S. PATENT DOCUMENTS 4,170,049 A * 10/1979 Gilliland ........................ 4/427

* cited by examiner

*Primary Examiner*—Huyen Le

(57) ABSTRACT

A toilet overflow control system is provided including a secondary float chamber and secondary float. The secondary float chamber is located below the toilet water tank and behind the toilet bowl at the water level of the toilet bowl and extending upward to the bottom of the toilet water tank. A vertical rod extends upward from the secondary float and is attached to a lever on the toilet water supply valve. This allows the secondary float to turn off the water when the toilet bowl water rises above a normal level. The vertical rod is inside a tube that allows it to go through the water tank without any loss of water. The secondary float chamber is fluidically connected to the toilet bowl by a horizontal conduit located just above the toilet bowl normal water level. A rinse hose is connected to the water supply valve to allow rinse water to flow into the secondary float chamber to prevent a back flow of water into the secondary float chamber during the flush.

1 Claim, 2 Drawing Sheets

TOILET OVERFLOW CONTROL

BACKGROUND OF THE INVENTION

1. Field of the Invention

The present invention relates to the general art of water closets, and to the particular field of control of water flowing to a water closet.

2. Discussion of the Related Art

Water damage is generally one of the most costly and devastating events that can occur to a homeowner or to someone who owns property. One source of such damage is leaking pipes, another source is water intrusion from outside and yet another source of water damage is associated with overflow of drains.

One Source of water is a toilet unit. Toilet units have various seals that may rupture or leak which may provide a path for water to flow out of the toilet unit. Still further, people often throw objects into a toilet that will clog the toilet and prevent water from flowing out of the toilet bowl in a proper manner. Flushing a clogged toilet may cause the toilet to overflow.

Therefore, there is a need to provide a toilet control system which prevents overflow from the toilet bowl.

The art contains many examples of alarms and the like that are intended to warn a person that water is present and thus warn a person that conditions exist in which water damage can occur. While these alarms are helpful, they do not minimize the damage, they only warn that it may occur. That is, if water is flowing onto a floor, the alarm merely alerts someone of the presence of water, it does not initiate steps to minimize the damage associated with water.

Therefore, there is a further need to provide a toilet control system which prevents overflow from the toilet bowl and which prevents water from being supplied to the bowl once water level in the bowl reaches a potentially overflowing location.

Once a toilet has been repaired, it can be safely operated. However, until such repair has been effected, it is risky to continue using a clogged toilet.

Accordingly, there is a need for a means for preventing use of a toilet that has the potential of overflowing until after the toilet has received attention.

Therefore, there is a further need to provide a toilet control system which prevents overflow from the toilet bowl which will prevent water from being supplied to a toilet bowl after the water has reached a potential overflow.

DESCRIPTION OF OPERATION

Figure 1:
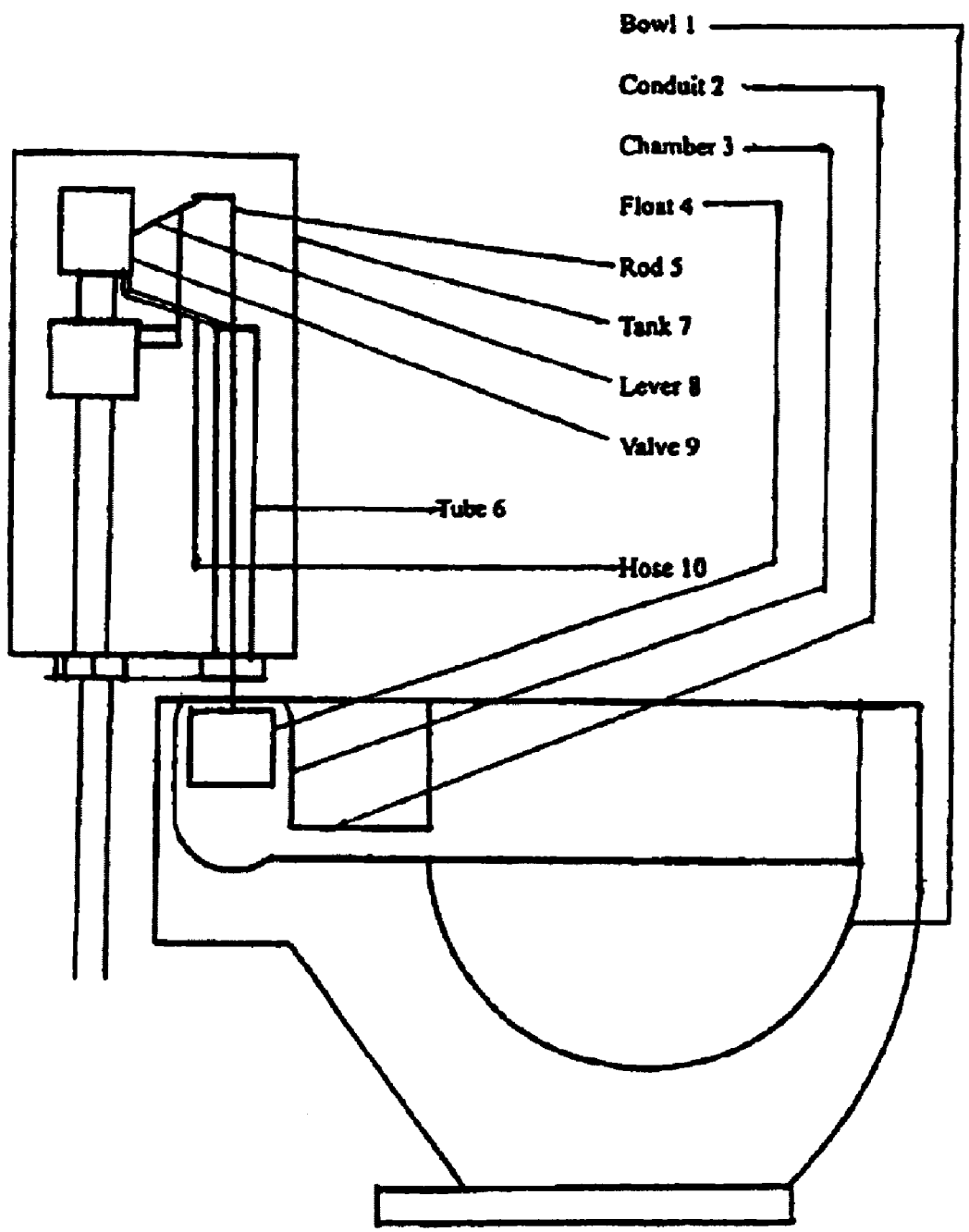
FIG. 1 is a toilet overflow control system having a flow 4 in an upper position.
Figure 2:
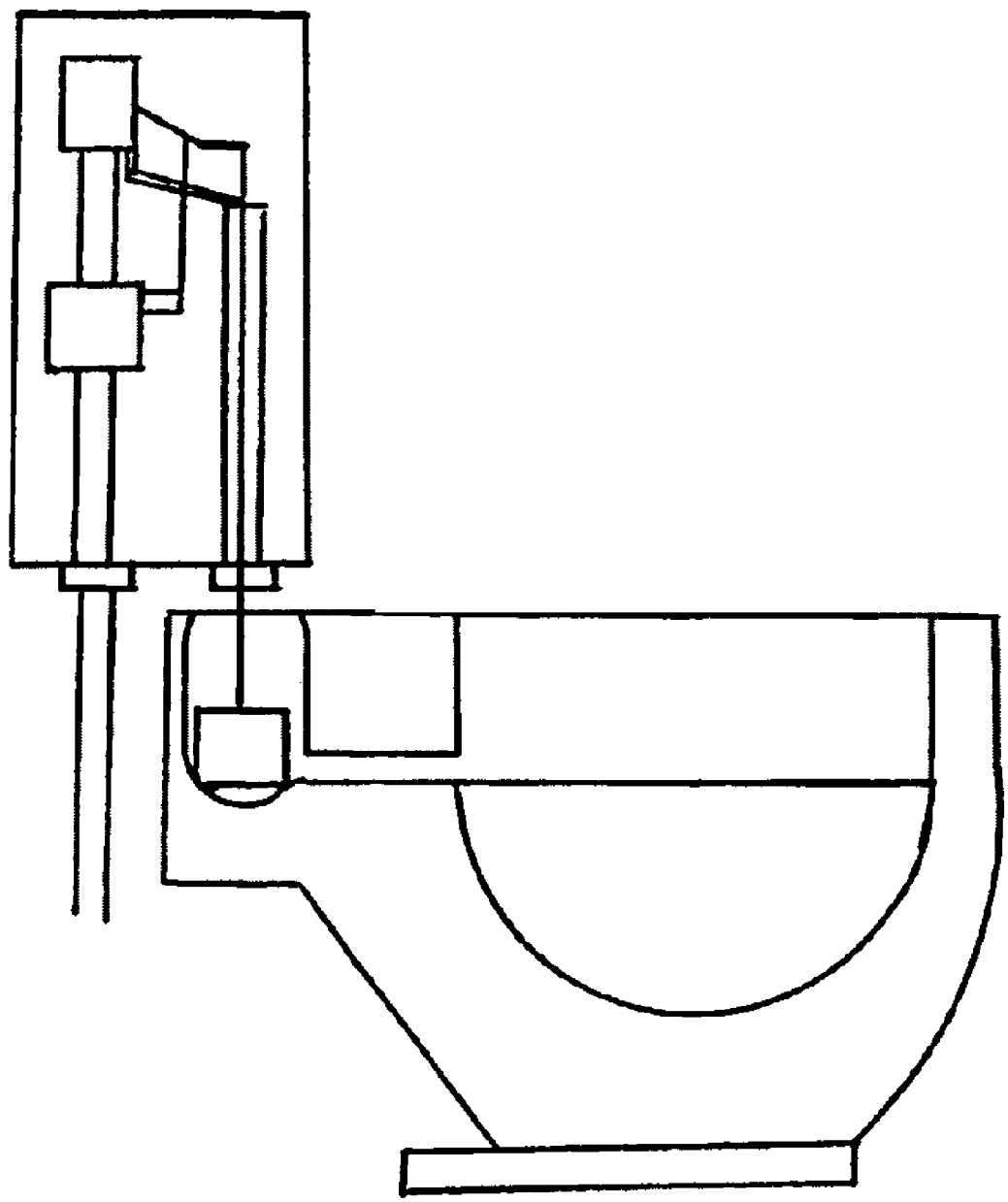
FIG. 2 is a toilet overflow control system having a flow 4 in a lower position.

In a toilet bowl 1 as water raises above a normal level a horizontal conduit 2 and a float chamber 3 fill with water. This causes a float 4 and a rod 5 to move upward with the water level. The rod 5 passes upward through a vertical tube 6 attached to the bottom of a water tank 7. The tube 6 is in alignment with a lever 8 on a valve 9 located inside the tank 7. This allows said rod 5 to move the lever 8 on the valve 9 in an upward motion stopping any flow of water into said tank 7. A rinse hose 10 allows water to flow into said tube 6 and the chamber 3 when said water valve is open.

Toilet Overflow Control

The structure of the invention consists of a typical toilet bowl with a horizontal water conduit located above the normal water line. The conduit allows a fluid connection to a float chamber located behind said bowl and above the water line. The float chamber contains a float with a vertical rod extending upward through a vertical tube in the water tank to allow the rod to connect to a water control valve lever. The tube is attached to the bottom of the tank and has a watertight seal. A rinse hose is connected to the valve and allows water to flow into the tube and the chamber when the valve is open.

References Cited [Referenced By]

U.S. Patent Documents

| | | | |
|---|---|---|---|
| 1956087 | April, 1934 | Tracy. | |
| D203378 | December, 1965 | Harold. | |
| 3959828 | June, 1976 | Acevedo. | |
| 4041557 | August, 1977 | Ringler. | 4/427. |
| 4145767 | March, 1979 | Ibel. | |
| 4402093 | September, 1983 | Luker et al. | |
| 4802246 | February, 1989 | Laverty, Jr. | 4/427. |
| 5608922 | March, 1997 | Lewis. | |
| 5732417 | March, 1998 | Pondelick et al. | 4/427. |
| 6016577 | January, 2000 | Cooley. | |
| 6052841 | April, 2000 | Mankin et al. | 4/427. |

What is claimed is:

1. A toilet overflow control system comprising a secondary float and float chamber at the same level as the water line in a typical toilet bowl, the float chamber fluidically connected to the toilet bowl by a horizontal conduit that allows the water level to rise in the float chamber when the water level in the toilet bowl rises above the normal water level, the secondary float then rising in the float chamber causing a vertical rod to move a lever on a water supply valve and stop the flow of water to a toilet tank, the vertical rod passing through a vertical tube to allow it to connect to the water supply valve lever, the vertical tube connected to the bottom of the toilet tank with a watertight seal, and a water hose connecting the water supply valve to the vertical tube to supply rinse water to the float chamber.

* * * * *